United States Patent Office 2,768,137
Patented Oct. 23, 1956

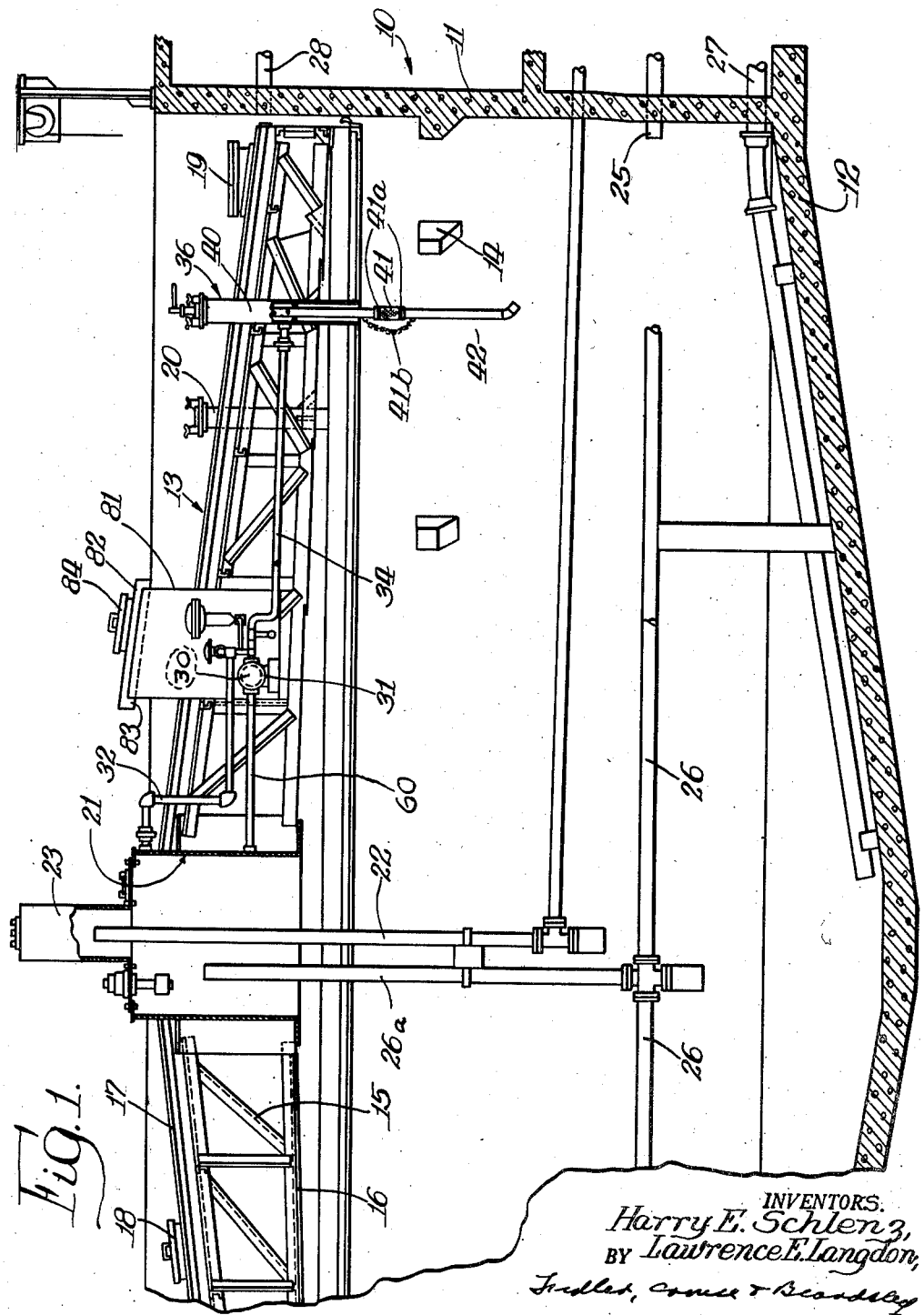

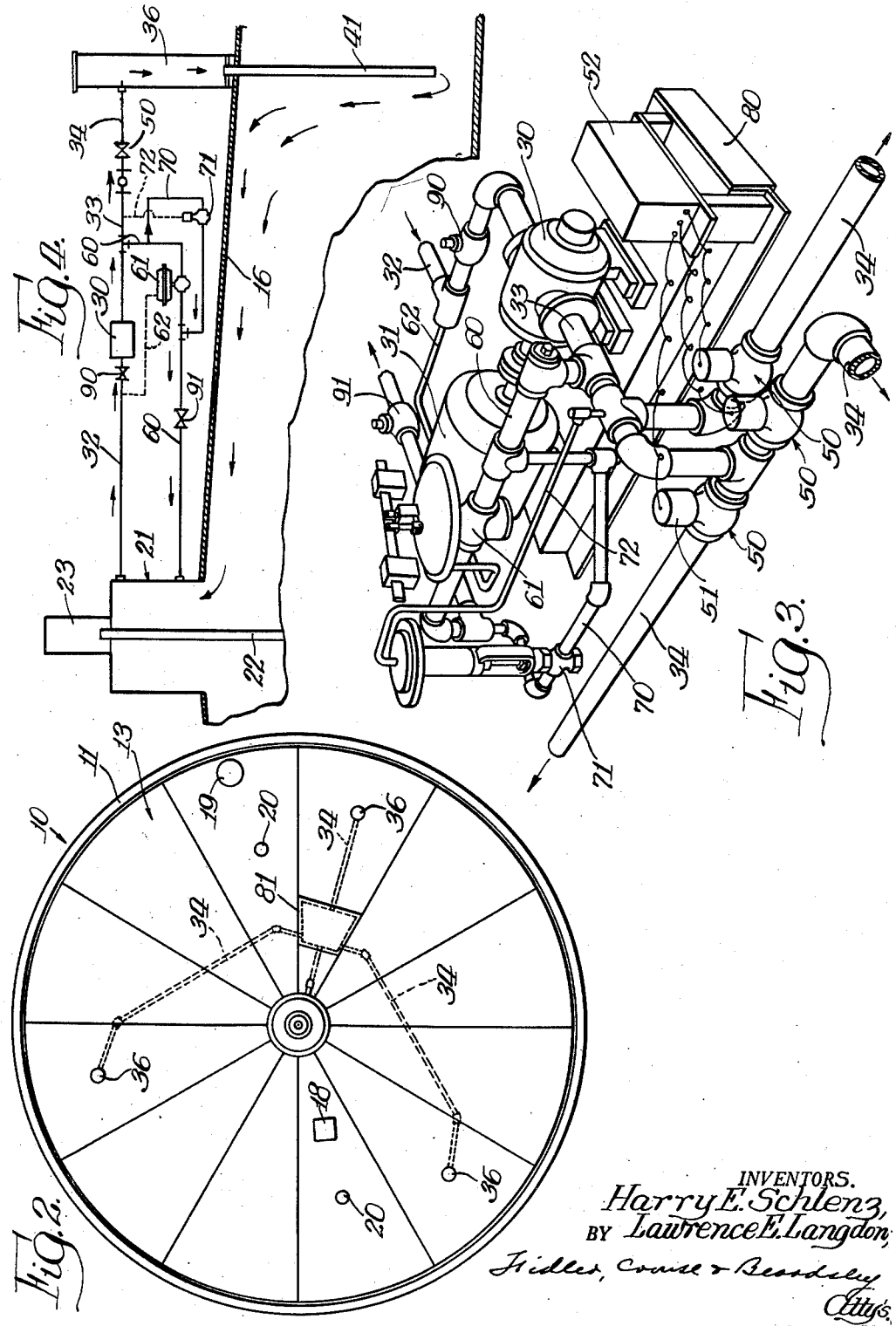

2,768,137
METHOD OF AND APPARATUS FOR DIGESTING SLUDGE

Harry E. Schlenz, Glencoe, and Lawrence E. Langdon, Wilmette, Ill., assignors to Pacific Flush Tank Company, Chicago, Ill., a corporation of Illinois Application November 19, 1953, Serial No. 393,202

18 Claims. (Cl. 210—2)

This invention relates to a method of and apparatus for digesting sludge containing organic wastes. More particularly, this invention has to do with the dispersion of the floating scum layer which forms on the digesting mass in the course of biological digestion of sludge containing organic wastes.

In the digestion, or "anaerobic fermentation" of organic matter as encountered in sewage sludge, trade wastes and garbage to be disposed of, and as carried out in digestion tanks, serious problems are encountered by reason of the formation of a layer of scum which forms at the top surface of the digesting mass. Most sludges of the foregoing character contain greases and soaps which are scum-forming and which separate from the raw solids added to the tank. Such scum consists of slowly digesting "layover" solids which take up space and reduce the effective digestion capacity of the tank. Moreover, this layer also constitutes a zone of high substrate concentration in which a high volatile acid content may develop and thus retard the rate of digestion. Also the scum seriously interferes with the overflow (i. e. discharge) of liquid from the digester by clogging the withdrawal lines. In the case of digestion tanks loaded with raw solids at a rate higher than normal, or in the case of certain trade wastes, such as those from meat packing houses and canneries, the amount of scum accumulations in a digestion tank may represent as much as 30 to 50 per cent of the volume of the digestion tank. For the foregoing reasons the formation of any considerable amount of scum in a digestion tank should be avoided.

It is well known that the greases and soaps in the separated scum are readily digestible with the production of large volumes of a useful byproduct, namely digester gas, but proper conditions must be established to bring actively digesting material into contact with the scum layer. Heretofore a number of methods have been used to keep scum accumulations within desirable minimum depth and volume. One such procedure has been the submergence of the scum by an impervious structure such as a digester floating cover, or by fixed steel or concrete cover, whereby the scum is maintained in the digester liquid and it is not allowed to float up into a space above the liquor, and containing the gaseous by-product of a digestion, and thus allowed to dry out. By the submergence of the scum it is kept at least in partial contact with the liquor in the tank which contains active organisms which support the digestion of the organic matter in the scum. Submergence of the scum is only partially effective and does not prevent excessive scum accumulations when the added raw sludge contains greater than normal amounts of greases.

Another expedient which tends to liquefy the scum and disperse it in the tank contents is the withdrawal of some of the digester liquor by means of an external pump and discharge of the liquor at a point above the scum level to bring active seeding liquor from the lower portions of the tank to the scum. Heating of raw solids additions by combining them with recirculated digester contents and passing them through an external heater prevent the separation of the grease particles in the raw sludge and greatly lessens the tendency to form a scum blanket in the digester. Experience indicates that keeping the scum moist and warm will result in normal digestion with large volumes of gas produced from such scum dispersal. The foregoing two procedures are quite effective in controlling scum under normal conditions, but excessive pumpage requirements and high power requirements together with the problems of clogging of the passages of the recirculation pump are encountered when raw solids containing excessive amounts of grease are thus handled, and the amount of material recirculated must be increased considerably above the amount required for merely heating the digester contents. The addition of ammonia nitrogen containing compounds to the digester liquor being recirculated to the scum zone has been beneficial in aiding the dispersal of scum layers that do not yield to recirculation alone. The addition of ammonia containing salts may be quite effective in connection with scum formed from the digestion of wastes which are deficient in nitrogen. In the case of sludge normally encountered, this introduces an additional and unnecessary chemical cost in the handling of the waste by digestion.

Various types of mechanical mixing devices have been employed in an attempt to disperse scum which forms in a digestion tank. Such devices, in addition to involving rather high power requirements, are not effective except in a small area or zone immediately adjacent the mixing device. In addition, serious difficulties have been encountered in the clogging of the mixer, making necessary the opening of the active digester for the purpose of removing or repairing the mixer.

An object of the present invention is to provide an improved method of dispersing the scum which forms on the digesting mass of material in the biological digestion of organic wastes.

Another object is to provide a method of dispersing the scum which forms on the digesting mass of material in the biological digestion of organic wastes in which method sludge gas is introduced into the mass below any scum formed thereon and in such manner that the introduction of a relatively small quantity of gas is sufficient to produce an effective dispersion of the scum.

Another object is to provide a method of dispersing the scum which forms on the digesting mass of material when organic wastes are subjected to biological digestion in which the gas evolved by the digestion is collected, compressed and introduced into the mass below any scum formed thereon and in such manner that the introduction of a relatively small quantity of gas is sufficient to produce an effective dispersion of the scum.

A further objection is to provide a method of dispersing the scum which forms on the digesting mass of material when organic wastes are subjected to biological digestion in which sludge gas evolved in the digestion is collected, compressed and introduced into the mass which method embodies such control of the pressure of the gas as to eliminate hazards which might otherwise exist.

A further object is to provide novel apparatus for digesting organic wastes having provision for dispersing the scum which forms on the digesting mass.

Still another object is to provide novel apparatus, including a digester for digesting organic wastes and having provision for dispersing the scum which forms on the digesting mass in which apparatus there are no moving parts within the digester.

Still another object is to provide apparatus for biologically digesting organic wastes and having provision for collecting and compressing gas evolved by the digestion and automatically introducing such gas into the digesting mass successively at spaced locations below the scum which forms on the mass.

A further object is to provide apparatus for collecting, compressing and introducing into the mass of digesting material in a sewage sludge digester gas which is evolved by the digestion which apparatus includes means for so controlling the pressure of the gas as to eliminate hazards which might otherwise exist.

A further object is to provide apparatus for biologically digesting organic wastes and having provision for collecting and compressing gas evolved by the digestion and introducing the gas into the mass under the scum, which apparatus may be operated at relatively low cost; is automatic in operation; requires a minimum of attention and servicing; is substantially free of clogging; is compact and capable of being installed in a relatively small space; lends itself readily to installation on or within a digester tank cover of the type which floats on the digester contents; is simple and inexpensive to manufacture, install and operate; and is suitable for installation in an existing digester having a cover of either the fixed or floating type and is entirely safe in its operation.

Other objects and advantages will appear from the following description taken in connection with the appended drawings, wherein:

Fig. 1 is a fragmentary, vertical sectional view of a preferred form of apparatus constructed in accordance with the invention;

Fig. 2 is a reduced, somewhat diagrammatic top plan view of the apparatus of Fig. 1;

Fig. 3 is a fragmentary perspective view of a portion of the apparatus of Figs. 2 and 3; and Fig. 4 is a diagrammatic view somewhat in the nature of a flow diagram illustrative of the preferred form of this invention.

According to the present invention the scum which forms at the top surface of the mass of material undergoing biological digestion is dispersed, at least to an extent sufficient to maintain the accumulation at a satisfactory depth and volume by introducing sludge gas under pressure into the digesting material successively at a plurality of different locations in the material. The gas discharged below the scum level causes a lifting action which brings active seeding material in the liquid into intimate and violent contact with the slowly digesting scum mass. The introduction of the gas into the material undergoing digestion at a plurality of points of discharge successively makes it possible to obtain an effective dispersing action with the introduction of a relatively small quantity of gas into the material.

According to the preferred embodiment of our invention the gas which is employed is the gas which is evolved in the digestion of the material in the same digestion tank to which the gas is returned. In other words, in the preferred embodiment of the process the gas evolved by the digestion process is recirculated through the digester contents. In this embodiment of the process the gas evolved by the digestion is collected, compressed and introduced into the digester below the level of any scum which may have been formed on the mass of material undergoing digestion. Preferably the sludge gas is introduced above the bottom level of the digester contents and above the level of the best digested material, which settles to the bottom of the tank and is in condition for removal from the system, in order to prevent agitating such material.

The present invention is disclosed for purposes of illustration in connection with a digester of the type embodying a tank and a cover therefor adapted to float on the mass of material in the tank but is not limited to that type of digester. The invention may also be carried out in connection with a digester of the type embodying a fixed cover, and particularly where submergence of the scum is provided. However, as will be pointed out hereinafter, there are certain operational advantages which accrue from the use of a digester of the type embodying a floating cover.

In the case of the use of the gas recirculation in connection with a floating or movable cover, or with a submerged type of fixed cover, where the digester contents are in positive contact with the cover, the gas which is discharged below the scum, in addition to bringing seeding liquor and solids into the scum zone by the gas lifting action, also causes a violent disturbance of the scum and continuing agitation and mixing during its full travel as it passes laterally to the gas dome at the center of the tank. This agitation during its complete travel causes full effective use of the gas for the agitation, mixing and dispersion of the scum.

One form of apparatus suitable for carrying out the invention is illustrated in the drawings to which reference now is made.

A digester 10 is provided which may be of conventional construction except for the added apparatus for recirculating the sludge gas as hereinafter described in detail. The digester 10 includes a side wall 11 and bottom slab 12 which may be of concrete construction as is usual. A cover 13 is provided which preferably is of the well known "floating" type, it being adapted to float on the contents of the digester and adjust its height in accordance with the level of the digester contents. Suitable stops or landing brackets 14 are provided for establishing the lower limit of movement of the cover.

The cover 13, which may generally be of any suitable construction, preferably includes a truss-like frame 15, an imperforate ceiling plate 16 and a roof 17 with the usual entrance hatch 18, access manhole 19 and sampling well 20. The cover 13 thus is of such construction as to provide a free air space between the imperforate ceiling plate 16 and the roof 17 and is well adapted to receive therein a substantial portion of the gas recirculating apparatus hereinafter described.

The cover 13 also is provided with the usual gas dome 21 which is centrally located and is adapted to receive and collect gas which is evolved during the digestion of the digester contents. A gas take-off conduit 22 leads from the upper reduced portion 23 of the gas dome 21 and extends out of the digester to a point of utilization of the gas. As is well known, the gas evolved during the digestion consists of methane and carbon dioxide usually in the proportion of approximately 60 to 70 per cent of methane and approximately 40 to 30 per cent of carbon dioxide. This gas is customarily utilized for heating and/or power purposes thereby serving to reduce the net cost of operation of the digester.

The digester 10 is also provided with a conduit 25 in a known manner for withdrawing sludge and/or liquor from the digester for the purpose of heating such sludge and/or liquor externally of the digester and a conduit 26 for returning withdrawn and heated sludge and/or liquor and for introducing additional raw sludge to be digested.

A draw-off conduit 27 is provided, with its inlet adjacent the bottom of the digester for withdrawing digested sludge solids. An overflow line 28 is provided for withdrawing supernatant or digester liquor in a known manner.

In accordance with the preferred embodiment of the invention means are provided for collecting sludge gas evolved during the digestion, compressing such gas and introducing such compressed gas under pressure into the digester contents below the level of any scum which may have formed thereon and successively at a plurality of locations spaced throughout the digester contents.

To the foregoing end a compressor 30 (Fig. 3) is provided which is suitably driven as by an electric motor 31 and having its intake connected by a draw-off pipe 32 to the gas dome 21. Connected to the discharge of the compressor 30 is a conduit 33 to which is connected in turn a plurality of (preferably at least three) distributing conduits 34, each of which leads to corresponding gas discharge means 36, which latter serves to introduce the sludge gas into the digester contents below the level of any scum which may have formed thereon. The gas discharge means or well 36 preferably is similar to the means disclosed and claimed in the copending application of Carl D. Wright, Serial No. 399,999 filed December 23, 1953 to which reference may be had for a more detailed disclosure.

Each gas discharge well includes a vertically disposed tubular casing 40 which extends down through and is secured in the ceiling plate 16, and the corresponding conduit 34 is connected to the interior of such casing. Within the casing 40 and extending therefrom is a rigid discharge pipe 42 which communicates with the interior of the casing 40 and which is of such length as to extend to the desired discharge location, namely a point well below the level of any scum which may form on the digester contents but above the best digested solids which have settled to the bottom of the digester. The material in the zone below the scum and above the best digested solids which settle to the bottom of the tank is commonly known in the art as "supernatant liquor"; it is the material which is in the best condition to be withdrawn and disposed of and which is drawn off when raw sludge is added to the digester. The pipe 42 is bent or curved at its lower portion and so arranged that it may be rotated in the housing 40 to cause the discharge end to describe an arc or circle to thus distribute the gas over an area rather than to discharge at a single point. The pipe 42 preferably includes two rigid sections which are joined by a short semi-flexible section 41 connected to the two rigid sections as by couplings 41a, whereby the lower rigid section of the pipe 42 may move angularly relatively to the upper section. Thus, when the pipe 42 is lowered into the digester, the lower end may move to permit the pipe to clear any of the several conduits or pipes in the digester which might otherwise interfere with the downward movement of the pipe 42. A short chain 41b or like member is connected to the pipe sections on each side of the semi-flexible section 41 to retain the lower section of the pipe 42 should either of the couplings 41a become loosened.

Instead of the rigid pipe 42, the discharge member may take the form of a flexible hose (not shown) connected to and communicating with the interior of the casing 40 and extending therefrom in a manner similar to the pipe 42 above described. Gas discharged into the digester causes the free discharge end of the flexible hose to move about and thus introduce gas into the digester contents over a distributed area rather than at a single point. Where a flexible hose is used for the discharge member, a weight (not shown) preferably is attached to the lower end and serves to return the free end of the hose to its lowermost position.

Where the digester is equipped with a fixed type of cover it may be necessary to arrange the pipe 42 (or the flexible hose) for adjustment vertically within its casing so that the lower or discharge end may be maintained below the level of the scum. However where, as in the preferred embodiment of the invention, the cover floats on the digester contents, the pipe will be raised or lowered as the cover adjusts itself to the level of the digester contents. Thus the discharge end of the pipe will always be at a predetermined level below the top of the digester contents and it will rarely if ever be necessary to change the position of the hose or pipe relative to the cover.

In accordance with the present invention gas is discharged from each of the discharge wells 36 for a predetermined period of time whereafter the discharge at that location is discontinued and gas is discharged at another discharge well. In other words, gas is discharged successively for a predetermined period at each of several spaced locations throughout the digester.

Thus, it is possible to accomplish an effective dispersion of the scum with the circulation of a relatively small quantity of gas and consequently a relatively low power expenditure. To this end a valve 50 is provided in each of the distributing conduits 34 for controlling the flow of gas therethrough. While the valve 50 may be a manually operated valve, such as a manually operated plug valve (not shown) of known construction, we prefer to use a motorized valve of known construction having a solenoid or motor actuating mechanism 51 and the several valves being controlled automatically by a multiple circuit program timer 52 of known construction. The timer 52 which preferably is electrically actuated but which may be spring motor driven, operates to open each valve 50 for predetermined period of time and then open the next valve in the sequence after which the previously opened valve is closed. This operation is repeated the period of time during which each valve is open and the interval between the operation of successive valves being adjusted according to the requirements of each particular installation. By allowing the next succeeding valve to open before the previously open valve is closed, an additional back-pressure on the compressor is prevented. Such an additional pressure might require the pressure relief to operate or induce an additional power requirement during the period that all discharge valves are closed.

The present invention provides certain safety features which include limiting the minimum pressure within the gas dome or collector and controlling the maximum pressure of the gas discharge. It is desirable that the pressure of the gas within the gas dome or collector be maintained at greater than atmospheric pressure in order to insure that no air enters the gas dome with the consequent likelihood of an explosion. Preferably the pressure of the gas within the gas dome is maintained at a minimum of 1 inch of water column.

This safety feature is particularly desirable when starting up the gas recirculation system. For example, the gas compressor may have a capacity of around 50 cubic feet per minute, while the rate of gas production in the digester may be less than 10 cubic feet per minute. Thus, if means were not provided to limit the minimum pressure within the gas dome, such pressure would be rapidly reduced to below that of the atmosphere, at least when starting the compressor and until the recirculation cycle was completely established.

The pressure within the gas dome is maintained by providing means for by-passing back to the gas dome certain of the gas withdrawn therefrom by the compressor 30. To this end a by-pass conduit 60 is connected to the discharge conduit 33 and leads back to the gas dome to which it is connected, preferably at a point lower than the withdrawal pipe 32. Connected in the by-pass conduit 60 is a pressure regulator 61 which is controlled, through a pipe 62, by the pressure in the draw-off pipe 32, that is to say by the pressure in the gas dome 21. The pressure regulator 61 is adjusted so as to open when the pressure in the draw-off conduit 32 falls below a predetermined value in excess of atmospheric pressure, for example a pressure of 1 inch of water column. When the pressure regulator opens, the by-pass conduit 60 is opened and a portion of the gas discharged by the compressor is returned directly to the gas dome 21 and is not circulated through the discharge conduits 34, the discharge well 36 and into the mass of digesting material within the digester. When the pressure within the gas dome is reestablished at or above the desired minimum the by-pass regulator operates to close the by-pass conduit so that all of the gas withdrawn from the gas dome 21 and discharged from the compressor 30 is discharged into the digesting material through the discharge well 36.

In order to prevent the pressure in the discharge line 33 from increasing above a predetermined maximum which would unduly overload the compressor, an additional by-pass 70 is provided which is connected between the discharge conduit 33 and the gas dome 21. For convenience the by-pass conduit 70 is connected at both ends to the by-pass conduit 60 and in parallel with the by-pass regulator 61. Connected in the by-pass conduit 70 is a pressure-actuated relief valve 71 actuated by the pressure in the discharge conduit 33 through a control pipe 72 connected to the discharge conduit 33. When the pressure in the discharge conduit 33 exceeds the desired maximum, the pressure relief valve 71 is actuated to allow gas to pass from the discharge conduit 33 directly back to the gas dome 21 and thus relieve the pressure in the discharge conduit 33. The pressure relief valve 71 is adjusted to open at a pressure which is determined by the operating characteristics of the compressor. That is to say, the pressure relief valve 71 is adjusted so as to prevent the gas in the discharge conduit 33 from exceeding a pressure which would render the operation of the compressor unsafe or injurious to the compressor.

It is to be understood that while the safety features just described have been disclosed in connection with a process and apparatus wherein the sludge gas is discharged into the digester contents successively at a plurality of locations, such safety features may also be employed in connection with a process and apparatus wherein the sludge gas is discharged at only a single location within the digesting material.

The gas dome or collector 21 preferably is made to have a relatively large capacity. Hence, there will be a relatively large supply of gas available after the process has attained normal gas production, and fluctuations in gas pressure in the gas dome will be less severe than were a small dome employed. Moreover, the large dome with its large quantity of gas serves to cool the gas discharged into the dome from the by-pass conduit and thus prevent overheating of the compressor. It will be understood that the gas which is recirculated through the digester contents will be sufficiently cooled thereby.

In certain instances it may be found desirable to adjust the flow of gas from the gas dome to the compressor or to adjust the flow through the by-pass pipe 60. Therefore, we provide manually operated plug valves 90 and 91 in the pipes 32 and 60 respectively. Similar plug valves may be included in each distributing line 34 immediately ahead of motorized valves 50 to allow for the manual closing of distributing line 34 if the motorized valve 50 must be replaced or repaired.

The motor 31, compressor 30 and preferably also the program timer 52 are secured to and supported on a base 80 and this assembly is disposed in a housing 81 which is carried by and, at least in part, enclosed in the cover 13. The housing 81 is provided with a cover 82 so arranged as to provide a vent 83 to atmosphere from the interior of the housing 81. An access opening may be provided in the cover 82 and closed by a cover 84. Also, as hereinbefore noted, the gas dome 21, pipes 32 and 34 and the gas discharge wells 36 all are carried by the cover 13. Thus all of the recirculating apparatus, except the electrical connections (not shown) between the motor and the source of power, and the electrical connections to the timer, are entirely carried by the cover. Accordingly, there are no problems of providing flexible connections or the like such as would arise where a floating cover was used and some of the recirculating apparatus was located in a fixed position outside of the digester.

The digestion process is started in the usual manner and allowed to proceed as is customary, except as hereinafter explained. Preferably, although not necessarily, sludge and/or liquor is withdrawn from the digester 10 through the conduit 25 and is heated externally of the digester as, for example, in the manner described in U. S. Patent to Harry E. Schlenz, No. 2,516,076, dated July 18, 1950. The sludge and/or liquor, after heating, is returned to the digester 10 through the conduit 26 and the branch conduit 26a, the latter of which discharges the heated sludge and/or liquor over the scum which serves in part to soften and disperse the scum. Raw sludge to be introduced to the digester preferably is heated and is mixed with the recirculated sludge and/or liquor prior to the introduction, as for example, in the manner disclosed in the aforesaid Schlenz patent. However, in some cases the contents of the digester need not be heated, or the contents may be heated by other known means. Also, if desired, the raw sludge may be introduced into the digester without heating.

As digestion proceeds, best digested solids sink to the bottom of the tank and are withdrawn through the draw-off conduit 27. The supernatant liquor is drawn off in a known manner and suitably disposed of.

Gas which is evolved by the digestion process and which consists of methane and carbon dioxide passes upwardly through the digesting mass and into the gas dome 21. That portion of such gas which is not recirculated is withdrawn through the gas take-off conduit 22.

The motor 31 is energized to drive the compressor 30 which withdraws from the gas dome 21, through the draw-off pipe 32, at least some of the gas which has collected in the gas dome. The withdrawn gas is compressed by the compressor 30 and discharged therefrom through the discharge conduit 33 and passes to that one of the distributing conduits 34 whose valve 50 happens to be open, as determined by the timer 52. The gas is caused to flow under pressure to the corresponding discharge well 36 and is discharged under pressure into the digesting mass through the pipe 41. As previously pointed out, the rigid pipe 42 may be rotated to cause the gas to be discharged over an area. On the other hand, where the flexible hose (not shown) is used it is caused to move about by the action of the gas flowing therefrom under pressure and thus the gas is introduced into the digester contents over a substantial area or zone.

The gas is discharged into the digester below the level of any scum which may have formed and passes upwardly through the digester contents and through the scum and back into the gas dome.

The gas passing through the digesting mass and the scum serves to violently agitate them. This action both breaks up the scum and brings active seeding digester liquor into intimate contact with large surface areas of the solids which formed the scum which permits digestion of such solids. Thus the scum layer is wholly or very substantially dispersed.

After a predetermined period of discharge of gas at the first discharge well 36 the corresponding valve 50 is closed by the action of the timer 52, but only after another valve is opened, in order to cause gas to be discharged at another discharge well. Thereafter the discharge at the second well is halted, after which the discharge at another well is carried out. This cycle is repeated in accordance with the program for which the timer is set.

We have found that desirable results in the dispersion of scum may be obtained and the scum maintained at a suitable minimum depth where from ½ to 1 cubic foot per minute of free gas, or an average of around ¾ cubic foot per minute, per foot of diameter of the digester is circulated through the digester contents. For example, for 100 foot diameter a circulation of approximately 75 cubic feet per minute of gas (or approximately 1 cubic foot per minute per 100 square feet of tank area) provides an adequate rate of gas discharge for effective dispersal of the scum. For a 100 foot diameter tank preferably four discharge points at which the gas is successively discharged are employed. For a tank 50 feet in diameter the gas should be discharged at a rate of approximately 50 cubic feet per minute (or approximately 1 cubic foot per minute per 40 square feet of tank area) and at three discharge points successively. In a tank as small as 20 feet in diameter a gas discharge rate of 1 cubic foot per minute per 15 square feet of digester area from one discharge point would be satisfactory.

Under normal conditions where sewage sludge is to be digested a discharge pressure of gas of approximately 5 pounds per square inch is found to provide excellent results. However, where conditions of excessive scum accumulations are encountered as, for example, in the digestion of some trade wastes, such as those from canneries, packing houses and tanneries, the gas discharge pressure should be somewhat higher and it may be necessary to employ a pressure up to approximately 10 pounds per square inch. The higher pressure is required to allow a greater submergence of the discharge point to discharge below the greater depth of scum.

From the foregoing it will be seen that the present invention provides a process and apparatus for effectively dispersing the scum which forms on the digesting mass of material in the biological digestion of organic wastes. The invention provides for the introduction of sludge gas evolved in the process into the digesting material successively at a plurality of locations spaced throughout the digesting mass and therefore such gas is widely distributed throughout the mass but at the same time it is necessary only to introduce a relatively small quantity of gas to produce the desired dispersion of the scum. Accordingly the pumpage, and consequently the power requirements, for the circulation of such gas are relatively low.

The invention also provides certain desirable safety features which effectively eliminate safety hazards which might otherwise arise by reason of the operation and which also eliminate the likelihood of undue strain on, or damage to, the apparatus employed to recirculate the sludge gas.

The operation in accordance with the invention is substantially automatic and requires a minimum of attention and the apparatus is such that it requires a minimum of attention and a minimum of servicing.

The apparatus according to the invention is simple and relatively inexpensive to build and install and it is of such construction that it can be installed in digesters which have already been constructed and installed. That is to say, the recirculating apparatus of the present invention requires for its installation little, if any, modification in existing digester structures. The apparatus lends itself excellently to installation in digester covers of the so-called "floating" type and therefore permits the realization of the advantages accruing from the use of floating covers. The apparatus may be installed entirely in, and carried entirely by, a floating cover, except for such electrical connections as may be necessary to furnish the requisite power for operating the apparatus.

We claim:

1. The method of dispersing the scum layer which forms on the digesting mass of material in the biological digestion of organic wastes which method comprises injecting sludge gas under pressure into the digesting mass for fixed periods successively at each of a plurality of laterally spaced locations under the scum layer and generally circumferentially about the central vertical axis of the mass.

2. The method of dispersing the scum layer which forms on the digesting mass of material in the biological digestion of organic wastes, which method comprises collecting gas evolved by the digestion, compressing at least a portion of said gas, and injecting said compressed gas into the digesting mass successively at each of a plurality of laterally spaced locations under the scum layer and generally circumferentially about the central vertical axis of the mass.

3. The method of dispersing the scum layer which forms on the digesting mass of material in the biological digestion of organic wastes which method comprises injecting sludge gas under pressure into the digesting mass successively at each of a plurality of laterally spaced locations under the scum layer and generally circumferentially about the central vertical axis of the mass.

4. The method of dispersing the scum layer which forms on the digesting mass of material in the biological digestion of organic wastes which method comprises injecting sludge gas under pressure into the digesting mass for a first period at one location under the scum layer, then halting the injection at such location, and injecting sludge gas under pressure into the digesting mass for additional periods sequentially at each of a plurality of additional locations under the scum layer and spaced circumferentially about the central vertical axis of the mass from said first location and from each other.

5. The method of dispersing the scum layer which forms on the digesting mass of material in the biological digestion of organic wastes which method comprises collecting sludge gas evolved by said digestion, compressing at least a portion of said gas, injecting said compressed gas into the digesting mass under the scum layer successively at a plurality of laterally spaced locations, and maintaining the pressure of the collected gas at a pressure not less than approximately one inch of water.

6. The method of dispersing the scum layer which forms on the digesting mass of material in the biological digestion of organic wastes which method comprises collecting sludge gas evolved by said digestion, compressing at least a portion of said gas, injecting said compressed gas into the digesting mass under the scum layer successively at a plurality of laterally spaced locations, and maintaining the pressure of the collected gas at not less than atmospheric pressure.

7. The method of dispersing the scum layer which forms on the digesting mass of material in the biological digestion of organic wastes which method comprises collecting sludge gas evolved by said digestion, compressing at least a portion of said gas, injecting said compressed gas into the digesting mass under the scum layer successively at a plurality of laterally spaced locations, and maintaining the pressure of injection of the gas into the mass at not greater than approximately 10 pounds per square inch.

8. The method of dispersing the scum layer which forms on the digesting mass of material in the biological digestion of organic wastes which method comprises collecting sludge gas evolved by said digestion, compressing at least a portion of said gas, injecting said compressed gas into the digesting mass under the scum layer successively at a plurality of laterally spaced locations, maintaining the pressure of the collected gas at not less than atmospheric pressure and maintaining the pressure of the gas injected into said mass at not more than approximately 10 pounds per square inch.

9. The method of dispersing the scum layer which forms on the digesting mass of material in the biological digestion of organic wastes which method comprises injecting sludge gas under pressure into the digesting mass for fixed periods successively at each of a series of circumferentially arranged locations under the scum layer spaced from the center and the periphery of said mass and substantially equally from each other.

10. Apparatus for digesting organic wastes comprising a digester tank of generally cylindrical form for containing the material to be digested, a cover for said tank, a collector for gas evolved in said tank, a compressor connected to said collector, and conduit means connected to said compressor and having a plurality of discharge outlets disposed in said tank below the scum which normally forms on the digesting mass in said tank and at locations spaced from both the center and the periphery of said tank and approximately equidistant from each other.

11. In apparatus for digesting organic wastes having a digester tank for containing the material to be digested, a cover for said tank having a collector for the gas evolved in said tank, a compressor, conduit means leading from said collector to said compressor and conduit means connected to said compressor and terminating in said digester tank under the scum which forms on the digesting mass, the improvement wherein said last-named means includes a plurality of discharge conduits extending downwardly from said cover and into said digester tank at locations spaced inwardly from the periphery of said tank and approximately equally from the central vertical axis of said tank and approximately equally from each other.

12. In apparatus for digesting organic wastes having a digester tank for containing the material to be digested, a cover for said tank, a collector for sludge gas, a compressor, conduit means leading from said collector to said compressor and conduit means connected to said compressor and terminating in said digester tank under the scum which forms on the digesting mass, the improvement wherein said last-named means includes a plurality of discharge conduits terminating under the scum layer at laterally spaced locations arranged generally circumferentially about the central vertical axis of said tank and spaced from the center and the periphery of said tank.

13. In apparatus for digesting organic wastes having a digester tank for containing the material to be digested, a cover for said tank, a collector for sludge gas, a compressor, conduit means leading from said collector to said compressor and conduit means connected to said compressor and terminating in said digester tank under the scum which forms on the digesting mass, the improvement wherein said last-named means includes a plurality of discharge conduits terminating under the scum layer at laterally spaced locations arranged generally circumferentially about the central vertical axis of said tank and closer to the periphery than the center of said tank.

14. In apparatus for digesting organic wastes having a digester tank for containing the material to be digested, a cover for said tank, a collector for the gas evolved in said tank, a compressor, conduit means leading from said collector to said compressor and conduit means connected to said compressor and terminating in said tank under the scum which forms on the digesting mass, the improvement wherein said cover is positioned to float on the digesting mass of material in said tank and said last-named means includes a plurality of discharge conduits carried by and extending downwardly from said cover and terminating under the scum layer at locations spaced inwardly from the periphery of said tank and approximately equally from the central vertical axis of said tank and approximately equally from each other.

15. In apparatus for digesting organic wastes having a digester tank for containing the material to be digested and in which supernatant liquor forms during digestion, a cover for said tank, a collector for the gas evolved in said tank, a compressor, conduit means leading from said collector to said compressor and conduit means connected to said compressor and terminating in said tank under the scum which forms on the digesting mass, the improvement wherein said cover is positioned to float on the digesting mass of material in said tank between upper and lower positions respectively and said last-named means includes a plurality of discharge conduits carried by and extending downwardly from said cover and into said digester tank, said discharge conduits being of such length that in all positions of said cover their discharge ends terminate in the supernatant liquor in said tank, and under the scum which forms on the digesting mass, said discharge conduits being arranged with their discharge ends at locations spaced inwardly from the periphery of said tank and approximately equally from the central vertical axis of said tank and approximately equally from each other.

16. In apparatus for digesting organic wastes having a digester tank for containing the material to be digested, a cover for said tank, a collector for sludge gas, a compressor, conduit means leading from said collector to said compressor and conduit means connected to said compressor and terminating in said digester tank under the scum which forms on the digesting mass, the improvement wherein said cover is positioned to float on the digesting mass of material in said tank and said last-named means includes a plurality of discharge conduits carried by and extending downwardly from said cover and into said digester tank, said discharge conduits being of such length that their discharge ends terminate under the scum which forms on the digesting mass and above the best digested solids which settle to the bottom of the tank and arranged with their discharge ends disposed generally circumferentially around the central vertical axis of said tank and spaced from both the center and the periphery of said tank.

17. In apparatus for digesting organic wastes having a digester tank for containing the material to be digested and in which supernatant liquor forms during digestion, a cover for said tank, a collector for sludge gas, a compressor, conduit means leading from said collector to said compressor and conduit means connected to said compressor and terminating in said digester tank under the scum which forms on the digesting mass, the improvement wherein said cover is positioned to float on the digesting mass of material in said tank between upper and lower positions respectively and said last-named means includes a plurality of discharge conduits carried by and extending downwardly from said cover and into said digester tank, said discharge conduits being of such length that in all positions of said cover their discharge ends terminate in the supernatant liquor in said tank and under the scum which forms on the digesting mass and said discharge conduits being arranged with their discharge ends generally circumferentially around the central vertical axis of said tank and spaced from both the center and the periphery of said tank.

18. In apparatus for digesting organic wastes having a digester tank for containing the material to be digested and in which supernatant liquor forms during digestion, a cover for said tank, a collector for the gas evolved during digestion in said tank, a compressor, conduit means leading from said collector to said compressor, conduit means connected to said compressor and including a plurality of discharge conduits terminating in said digester tank under the scum which forms on the digesting mass and valves in said discharge conduits for independently controlling the flow of gas from each of said discharge conduits, the improvement wherein said cover is positioned to float on the digesting mass of material in said tank between upper and lower positions, respectively, and the said discharge conduits are carried by and extend downwardly from said cover and into said digester tank and are of such length that in all positions of said cover their discharge ends terminate in the supernatant liquor in said tank and under the scum which forms in the digesting mass, the discharge ends of said conduits being disposed at locations spaced inwardly from the periphery of said tank and approximately equally from the central vertical axis of said tank and approximately equally from each other whereby gas may be discharged selectively at said spaced locations.

References Cited in the file of this patent

UNITED STATES PATENTS

| 2,538,412 | Cecil et al. | Jan. 16, 1951 |
| 2,640,027 | McNamee et al. | May 26, 1953 |

OTHER REFERENCES

Sewerage & Sewerage Treatment—Babbitt, 6th ed. (1947.)